(12) United States Patent
Suzuki (10) Patent No.: US 8,745,857 B2
(45) Date of Patent: Jun. 10, 2014

(54) SPOT WELDING TIP DETACHING APPARATUS

(75) Inventor: Satoru Suzuki, Shizuoka (JP)

(73) Assignee: Suzuki Motor Corporation, Shizuoka (JP)

( * ) Notice: Subject to any disclaimer, the term of this patent is extended or adjusted under 35 U.S.C. 154(b) by 1125 days.

(21) Appl. No.: 12/723,543

(22) Filed: Mar. 12, 2010

(65) Prior Publication Data
US 2010/0236060 A1  Sep. 23, 2010

(30) Foreign Application Priority Data
Mar. 19, 2009  (JP) ................. 2009-068633

(51) Int. Cl.
B23K 11/11  (2006.01)

(52) U.S. Cl.
USPC ........................... 29/762; 219/86.8

(58) Field of Classification Search
CPC ................................. B23K 11/115
USPC ........................ 29/762; 219/86.8
See application file for complete search history.

(56) References Cited

U.S. PATENT DOCUMENTS

| | | | |
|---|---|---|---|
| 5,495,663 A * | 3/1996 | Saito ................. | 29/762 |
| 5,734,141 A | 3/1998 | Voilmy et al. | |
| 6,188,038 B1 * | 2/2001 | Kazuhiro ............ | 219/86.8 |
| 6,667,454 B2 * | 12/2003 | Rigaux ............... | 219/86.8 |

FOREIGN PATENT DOCUMENTS

| | | |
|---|---|---|
| DE | 3323038 C2 | 9/1986 |
| DE | 3822655 C1 | 2/1990 |
| DE | 19724371 C1 * | 10/1998 |
| EP | 1108493 A2 | 6/2001 |
| JP | 7144284 A | 6/1995 |
| JP | 2006346701 A | 12/2006 |

OTHER PUBLICATIONS

German Patent Application No. 102010000170.8: Office Action, dated Aug. 27, 2011.

* cited by examiner

*Primary Examiner* — Livius R Cazan
(74) *Attorney, Agent, or Firm* — Troutman Sanders LLP (57) ABSTRACT

A spot welding tip detaching apparatus includes a movable plate, an engaging/stopping part, and a holder part. The movable plate has a guide hole through which a shaft set upright in a base plate is inserted with a gap being left between the guide hole and the shaft, rotatable relative to the base plate, and movable along the base plate within a range of the guide hole. The engaging/stopping part stops the movable plate at a predetermined position of the base plate by engagement in an engageable/disengageable manner. The holder part is provided integrally on the movable plate to hold a tip fitted in a spot welding gun. The holder part sandwiches the tip between two members of the holder part. According to movement of the tip along a predetermined route, the holder part rotates the tip, while holding the tip, to detach the tip from the spot welding gun.

16 Claims, 9 Drawing Sheets

POSITION BACK | RETURNING TO ORIGINAL POSITION | TIP REMOVAL

FIG. 10

GUN MOVEMENT | POSITIONING + LOADING OF LOWER TIP | LOADING OF UPPER AND LOWER TIPS

SPOT WELDING TIP DETACHING APPARATUS

CROSS-REFERENCE TO RELATED APPLICATIONS

This application is based upon and claims the benefit of priority of the prior Japanese Patent Application No. 2009-068633, filed on Mar. 19, 2009, the entire contents of which are incorporated herein by reference.

BACKGROUND OF THE INVENTION

1. Field of the Invention

The present invention relates to a spot welding tip detaching apparatus which detaches a tip being an electrode fitted in a spot welding gun.

2. Description of the Related Art

In a production line of automobile bodies, spot welding is often used. The spot welding is a welding method in which metal plate materials or the like which are laid one on the other are sandwiched from both sides and by the local application of pressure and the passage of an electric current, metals are melted by resistance heat to make the metal plate materials adhere to each other.

In the spot welding, an apparatus called a spot welding gun (hereinafter, a welding gun) is generally used. The welding gun welds metal plate materials or the like by sandwiching the metal plate materials by a pair of electrodes and passing an electric current therethrough while pressing them. The electrodes are fitted in tip portions of bar-shaped members (hereinafter, shanks), one of the tip portions facing the other tip portion. One of the shanks or both of them is (are) capable of advancing/retracting, which enables the electrodes to sandwich the metal plate materials or the like.

The electrodes of the welding gun are generally called cap tips (hereinafter, tips). The tips are deformed or worn away due to long-time use, and such deformation or wearing, if any, sometimes makes it impossible to maintain desired welding quality. Therefore, in the welding gun, the tips are periodically replaced.

As an apparatus for tip replacement, an apparatus is on the market which detaches a tip by moving a welding gun, inserting the tip to a holder part of a tip detaching apparatus, and after holding the tip by a chuck device, such as an air-operated chuck, moving the welding gun in an up and down direction while rotating the tip by an electric motor or the like.

Further, Japanese Laid-open Patent Publication No. 2006-346701 and Japanese Laid-open Patent Publication No. 07-144284 disclose methods for detaching a tip by inserting a plate-shaped member into a gap between the tip and a shank on a tip mounting side and prying the tip and the shank by a robot operation or device.

However, the aforesaid apparatus on the market requires the air and electric motive power used for holding the tip and for detaching the tip and thus has problems that it has a complicated structure and high cost.

Further, the apparatuses disclosed in Japanese Laid-open Patent Publication No. 2006-346701 and Japanese Laid-open Patent Publication No. 07-144284 require a certain size of gap between the tip and the shank. Therefore, a gap large enough to enable the detaching of the tip cannot be sometimes reserved depending on a state of the gap and the shape and size of the welding gun, that is, the type of the shank (tip base) and the size of the tip (for example, φ16 or φ13), which has posed a problem that these apparatuses cannot be flexibly used. Further, since the tip is pried when detached, the shank, for example, is sometimes damaged, which sometimes necessitates the replacement of the shank and so on because the shank and so on are deformed after the long use.

SUMMARY OF THE INVENTION

The present invention was made in view of the above problems and has an object to make it possible to detach a tip fitted in a spot welding gun without requiring motive power and with an extremely simple structure. Another object is to make it possible to easily detach a tip, irrespective of a gap between the tip and a shank and the size and shape of a spot welding gun. Still another object is to make it possible to detach a tip by a simple detaching operation without giving any load to a spot welding gun side.

A spot welding tip detaching apparatus of the present invention is a spot welding tip detaching apparatus which detaches a tip fitted in a spot welding gun, the apparatus comprising: a movable plate having a guide hole through which a shaft set upright in a base plate is inserted with a gap being left between the guide hole and the shaft, rotatable relative to the base plate, and movable along the base plate within a range of the guide hole; an engaging/stopping part stopping said movable plate at a predetermined position of the base plate by engagement in an engageable/disengageable manner; and a holder part provided integrally on said movable plate to hold the tip fitted in the spot welding gun in a sandwiched manner, wherein according to movement of the tip fitted in the spot welding gun along a predetermined route, said holder part rotates the tip while holding the tip to detach the tip from the spot welding gun.

DETAILED DESCRIPTION OF THE PREFERRED EMBODIMENTS

Hereinafter, a preferred embodiment of the present invention will be described.

—Structure of Apparatus—

Figure 1:
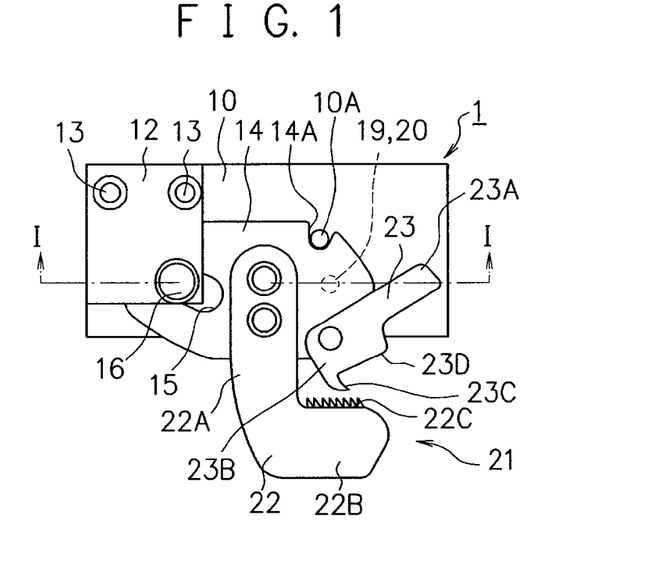
FIG. 1 is a plane view of a spot welding tip detaching apparatus according to an embodiment of the present invention.
Figure 2:
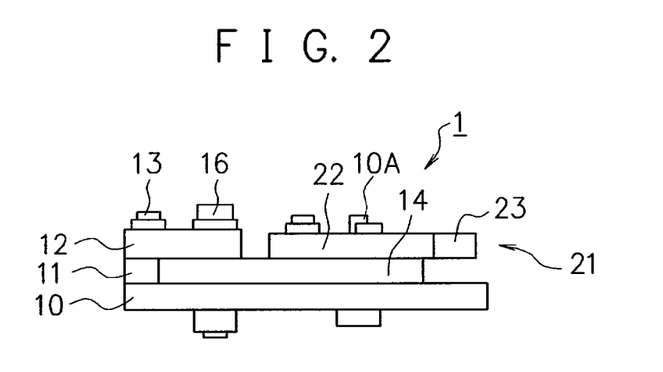
FIG. 2 is a side view of the spot welding tip detaching apparatus according to the embodiment of the present invention.
Figure 3:
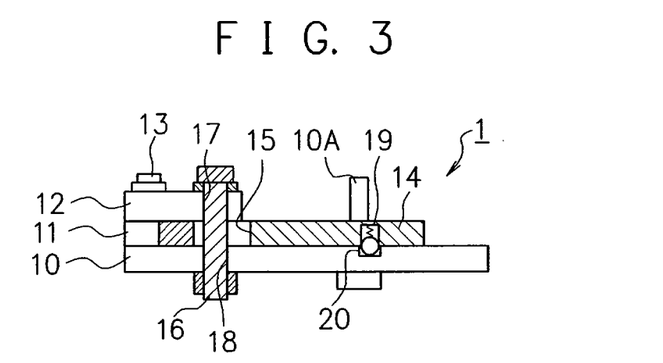
FIG. 3 is a side sectional view of the spot welding tip detaching apparatus according to the embodiment of the present invention.

FIG. 1, FIG. 2, and FIG. 3 are a plane view, a side view, and a side sectional view of a spot welding tip detaching apparatus 1 according to the embodiment of the present invention respectively.

As illustrated in FIG. 1 to FIG. 3, in this embodiment, the spot welding tip detaching apparatus (hereinafter, referred to as a tip detaching apparatus) 1 has, as its main constituent members, a base plate 10, a shaft 16, a movable plate 14, a stopper plate 12, a positioning bolt stopper 10A, a ball plunger 19, and a holder part 21.

The base plate 10 is made of a steel plate and has a certain thickness. The base plate 10 supports the stopper plate 12 in a plate shape by an edge side of its upper surface via a supporter 11. A thickness of the supporter 11 is set larger than a plate thickness of the movable plate 14, so that space large enough to dispose the movable plate 14 in a sandwiched manner therein is formed between the base plate 10 and the stopper plate 12. Here, the supporter 11 is formed of a bridge having a through hole, and the stopper plate 12 is fixed to the base plate 10 by bolts 13 or the like via the supporter 11. However, as the supporter 11, a member such as a nut may be simply used, or the base plate 10 and the stopper plate 12 may be worked into an integrated body.

When the base plate 10 and the stopper plate 12 are assembled via the supporter 11, the movable plate 14 is disposed in the space formed therebetween. The movable plate 14 is formed of a steel plate so as to have a plate shape and has in a portion thereof a long hole 15 serving as a guide hole, and the shaft 16 is inserted through the long hole 15 (FIG. 3). When inserted through the long hole 15, the shaft 16 is set upright relative to the base plate 10 with one end side thereof supported by the stopper plate 12 and the other end side supported by the base plate 10. Through holes 17, 18 are formed in the base plate 10 and the stopper plate 12 respectively, and the shaft 16 is fixed by the through holes 17, 18. Here, the shaft 16 is made of a bolt and its head portion is supported by the stopper plate 12 and its lower end is fixed by a nut on a lower surface of the base plate 10. An alternative structure may be, for example, to cut threads in one of or both of the base plate 10 and the stopper plate 12.

The long hole 15 formed in the movable plate 14 is formed larger than a sectional area of the shaft 16, so that when the shaft 16 is inserted through the long hole 15, a sufficiently large space is formed between the long hole 15 and the shaft 16. Therefore, when the movable plate 14 is disposed between the base plate 10 and the stopper plate 12, the movable plate 14 is not only rotatable with respect to the shaft 16 but also translationally movable along a longitudinal direction of the long hole 15, that is, movable along an upper surface of the base plate 10 within a range of the long hole 15. Here, the movement of the movable plate 14 in an axial direction of the shaft 16 is restricted by the stopper plate 12. Further, in this embodiment, the sectional area of the shaft 16 is relatively smaller than a formation range of the long hole 15 as is apparent from FIG. 3, which allows the movable plate 14 not only to move in the longitudinal direction of the long hole 15 but also to move in all directions where the gap is formed. It should be noted that, though the example where the shaft 16 is relatively smaller than the long hole 15 is given here, their relation is preferably changed when required rigidity is high.

Further, as illustrated in FIG. 3, the ball plunger 19 included in an engaging/stopping part restricting the rotation and the movement of the movable plate 14 relative to the base plate 10 is provided between the base plate 10 and the movable plate 14. Note that in FIG. 3, which is a cross-sectional view taken along I-I line in FIG. 1, a meshing piece 22, which will be described later, is not illustrated for convenience sake.

The ball plunger 19 is attached by being fitted or screwed in a bore formed in a rear surface of the movable plate 14, and its head portion (ball portion) is biased toward the base plate 10. In the base plate 10, a fitting hole 20 being a concave portion is formed in its surface facing the head portion of the ball plunger 19, and when the head portion is engaged with the fitting hole 20, the movable plate 14 is stopped relative to the base plate 10. A position where the ball plunger 19 is attached and a position where the fitting hole 20 is formed are set at predetermined positions so that a longitudinal direction of the base plate 10 matches a longitudinal direction of the movable plate 14 when the ball plunger 19 is engaged with the fitting hole 20.

Further, in the base plate 10, the positioning bolt stopper (hereinafter, the bolt stopper) 10A is provided upright, and a cutout 14A is formed in the movable plate 14. The bolt stopper 10A is engaged with the cutout 14A while the ball plunger 19 is engaged with the fitting hole 20, so that the movement of the movable plate 14 in the longitudinal direction of the base plate 10 is restricted in the state where the longitudinal direction of the base plate 10 and the longitudinal direction of the movable plate 14 match each other. This state is maintained owing to the engagement between the ball plunger 19 and the fitting hole 20. In order to allow the movable plate 14 to freely rotate and move from this state, the movable plate 14 is moved in a direction where the movable plate 14 separates from the bolt stopper 10A (typically, lower side in FIG. 1 of a direction perpendicular to the longitudinal direction of the base plate 10) and a certain external force is applied, whereby the engagement between the ball plunger 19 and the fitting hole 20 is released. That is, a set of the ball plunger 19 and the fitting hole 20 and a set of the ball stopper 10A and the cutout 14A stop the movable plate 14 at a predetermined position of the base plate 10 by the engagement in an engageably and disengageably manner.

Further, on an upper surface of the movable plate 14, the holder part 21 is integrally provided. The holder part 21 is intended for holding each of tips, which are electrodes fitted in the spot welding gun, in a sandwiched manner and is structured here such that two members work together to sandwich the tip.

The meshing piece 22 being one of the members forming the holder part 21 is formed of a steel plate so as to have a substantially hook shape or a substantially L shape. A root side (hereinafter, a root-side side portion 22A) of the meshing piece 22 is fixedly supported by the movable plate 14 so that a tip side (hereinafter, a tip-side side portion 22B) of the meshing piece 22 becomes parallel to the longitudinal surfaces of the base plate 10 and the movable plate 14 in the state where the ball plunger 19 and the fitting hole 20 are engaged with each other, that is, in the state where the longitudinal direction of the base plate 10 and the longitudinal direction of the movable plate 14 match each other.

In the state where the tip-side side portion 22B of the meshing piece 22 is parallel to the longitudinal direction of the base plate 10, space with a certain size is formed between the tip-side side portion 22B and side surfaces of the base plate 10 and the movable plate 14, and this space needs to have a certain width. Therefore, the root-side side portion 22A of the meshing piece 22 is formed so as to have a certain length. Such space is required in order to well receive the later-described tip fitted in the spot welding gun.

Further, on a movable plate 14-side surface of the tip-side side portion 22B of the meshing piece 22, a teeth portion 22C formed in a cutting-tooth shape is formed. The teeth portion 22C is a portion abutting on the tip and is formed of a plurality of continuous cutting-tooth shaped portions. In the teeth portion 22C, peaks of the cutting-tooth shaped portions are formed to be inclined toward the root-side side portion 22A. Incidentally, the teeth portion 22C is preferably subjected to tempering or the like to be hardened.

A clamping piece 23 being the other one of the members forming the holder part 21 is formed of a steel plate so as to have a substantially L shape. The clamping piece 23 is rotatably supported by the movable plate 14 in the vicinity of a coupling portion between a long side portion 23A and a short side portion 23B of the substantially L shape. The clamping piece 23 is supported so that an end portion of the short side portion 23B faces the teeth portion 22C of the meshing piece 22 since an inner side of the long side portion 23A of the substantially L shape is a portion abutting on the tip.

Further, on the end side of the short side portion 23B of the substantially L shape of the claming piece 23, a front surface-side abutting portion 23C abutting on the tip is formed. In the clamping piece 23, the front surface-side abutting portion 23C rotates when it abuts on the tip and thus is pushed, and the tip is pressed by an inner side (lateral-side abutting portion 23D) of the long side portion 23A. Incidentally, the inner side of the long side portion 23A, that is, its portion abutting on the tip is preferably subjected to tempering or the like to be hardened.

The holder part 21 is composed of the meshing piece 22 and the clamping piece 23 as described above. Here, how the tip fitted in the spot welding gun is held by the holder part 21 will be described. As described above, in the holder part 21, the tip is sandwiched by the teeth portion 22C of the meshing piece 22 and the inner side of the long side portion 23A of the clamping piece 23. When the tip fitted in the spot welding gun is to be detached by the tip detaching apparatus 1, which will be described in detail later, the tip in the state of being fitted in the spot welding gun is moved by an articulated robot. Then, by the linear movement, the tip enters the space formed by the meshing piece 22 and the clamping piece 23. That is, the meshing piece 22 and the clamping piece 23 receive the tip in the space formed therebetween. In this case, the tip first abuts on the front surface-side abutting portion 23C in the short side portion 23B of the clamping piece 23 to be pressed, and the clamping piece 23 rotates accordingly. Then, the clamping piece 23 presses the tip against the teeth portion 22C of the meshing piece 22 from a lateral direction by the lateral-side abutting portion 23D on the inner side of the long side portion 23A. Here, since the rotation and the movement of the movable plate 14 are restricted by the bolt stopper 10A and so on, the tip is pressed from the clamping piece 23 with a certain degree of force due to a force accompanying its own linear movement, and is engaged with the meshing piece 22 and the clamping piece 23.

Then, from the state where the tip is engaged by being pressed against the teeth portion 22C of the meshing piece 22 from the lateral direction by the lateral-side abutting portion 23D, the tip is linearly moved in a direction that is a direction perpendicular to the direction in which the tip enters and that is a direction in which the tip separates from the base plate 10, and the engagement state of the ball plunger 19 is released. Here, in the teeth portion 22C, the peaks of the cutting tooth-shaped portions are formed to be inclined toward the root-side side portion 22A, and the tip is pressed against the teeth portion 22C by this movement. In this case, the tip receives a force or is biased so as to enter deeper between the meshing piece 22 and the clamping piece 23. As a result, the tip is sandwiched (engagingly held) by the meshing piece 22 and the clamping piece 23.

The holder part 21 thus holds the tip in the sandwiched manner. After the tip is held, a tip detaching operation is started by further moving the tip. Details thereof will be described later. Further, when the clamping piece 23 is rotated in an opposite direction (anticlockwise direction in FIG. 1) while the tip is held, the tip is released from the sandwiched state and the tip can be easily detached. Here, setting the long side portion 23A of the clamping piece 23 relatively long makes it possible to relatively easily detach the tip since a torque is secured.

—Structure of Articulated Robot Loaded with Spot Welding Gun—

Figure 4A:
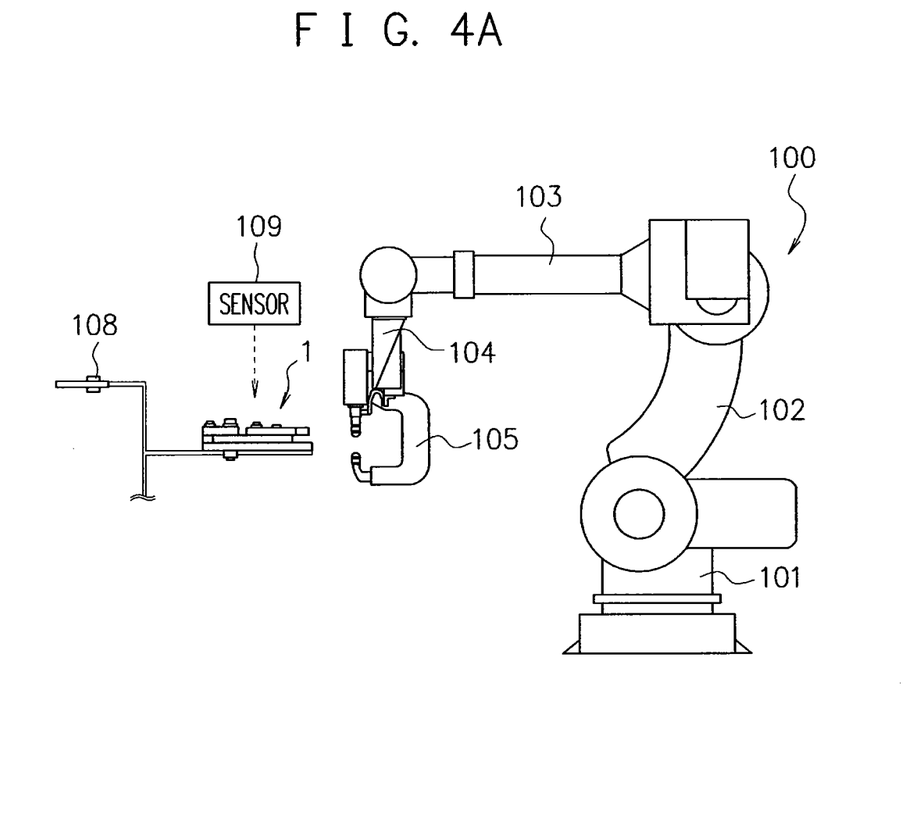
FIG. 4A is a view illustrating an articulated robot loaded with a spot welding gun.
Figure 4B:
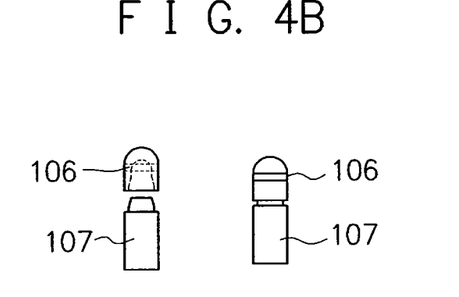
FIG. 4B is a view for explaining a tip fitted in the spot welding gun.

FIG. 4A is a view illustrating an articulated robot loaded with the spot welding gun, and FIG. 4B is a view for explaining the tip. The tip detaching apparatus 1 is an apparatus to detach the tips fitted in the spot welding gun loaded on the articulated robot by using the operation of the articulated robot. Hereinafter, the structures of the articulated robot, the spot welding gun, and the tips will be described by using FIG. 4A and FIG. 4B.

An articulated robot 100 has: a base portion 101 rotatable in a horizontal direction; a first arm 102 whose base end is supported by the base portion 101 and which is rotatable in a vertical direction; a second arm 103 whose base end is supported by an end portion of the first arm 102 and which is rotatable in the vertical direction; and a third arm 104 whose base end is supported by an end portion of the second arm 103 and which is rotatable in the vertical direction. Rotating portions of the base portion 101, the first arm 102, the second arm 103, and the third arm 104 are rotation-controlled so as to displace by a desirable amount by a servo motor or the like receiving a command of a computer or the like, and an end portion of the third arm 104 is freely movable.

A spot welding gun 105 whose power source is a servo, air pressure, or the like is loaded at the end portion of the third arm 104. The spot welding gun 105 sandwiches metal plate materials or the like by a pair of electrodes and in this state, passes an electric current to the metal plate materials or the like while pressing them. As illustrated in FIG. 4B, the electrodes (hereinafter, tips 106) are fitted to rod members (hereinafter, shanks 107) which are disposed so that an end portion of one of them faces an end portion of the other. In this embodiment, the upper shank 107 is capable of advancing/retracting and the lower shank 107 is fixed, and when the upper shank 107 is driven, the metal plate materials or the like can be sandwiched by the tips 106.

The tip detaching apparatus 1 described above is an apparatus detaching the tips 106 by using the operation of the articulated robot 100. Therefore, the tip detaching apparatus 1 needs to be disposed within a range where the articulated robot 100 is freely movable. In this embodiment, as an example, the tip detaching apparatus 1 is disposed as illustrated in FIG. 4A, but it may be disposed in any way provided that it is disposed within the range where the articulated robot 100 is freely movable.

Further, in FIG. 4A, the tip detaching apparatus 1 is fixedly supported at a position having a certain degree of height, and in this case, an appropriate mounting part is provided on the base plate 10. Further, near the tip detaching apparatus 1, a tip holder 108 and a tip sensor 109 are disposed. The tip holder 108 holds tips on its upper and lower surfaces respectively. Disposing the tip holder 108 near the tip detaching apparatus 1 enables immediate shift to an operation of attaching new tips after the tips are detached. Further, the tip sensor 109, which is a sensor for checking whether or not the tip detaching apparatus 1 has detached the tips, checks the tips to notify the result to a computer, thereby enabling smooth shift to the tip attaching operation after the tips are detached.

—Tip Detaching Operation—

Figure 6:
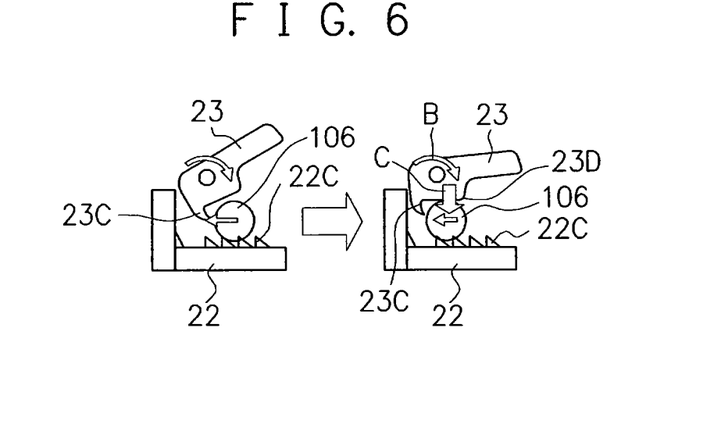
FIG. 6 is a view for explaining a detailed operation of a holder part during the tip detaching operation by the spot welding tip detaching apparatus according to the embodiment of the present invention.
Figure 7:
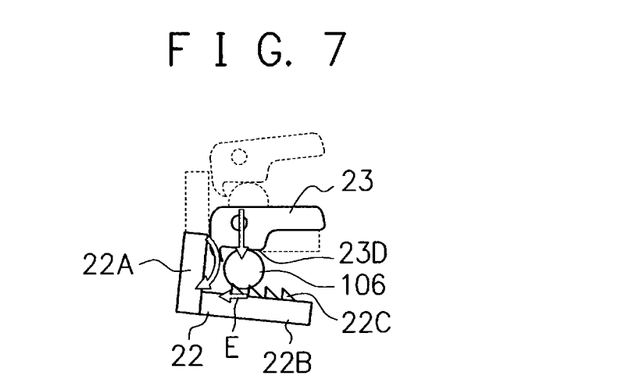
FIG. 7 is a view for explaining a detailed operation of the holder part during the tip detaching operation by the spot welding tip detaching apparatus according to the embodiment of the present invention.
Figure 8:
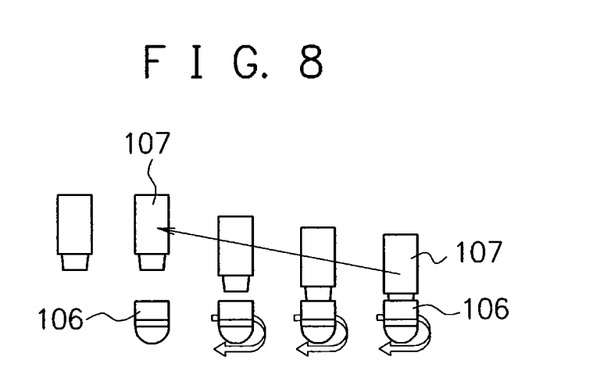
FIG. 8 is a view schematically illustrating how the tip is detached by the spot welding tip detaching apparatus according to the embodiment of the present invention.
Figure 9:
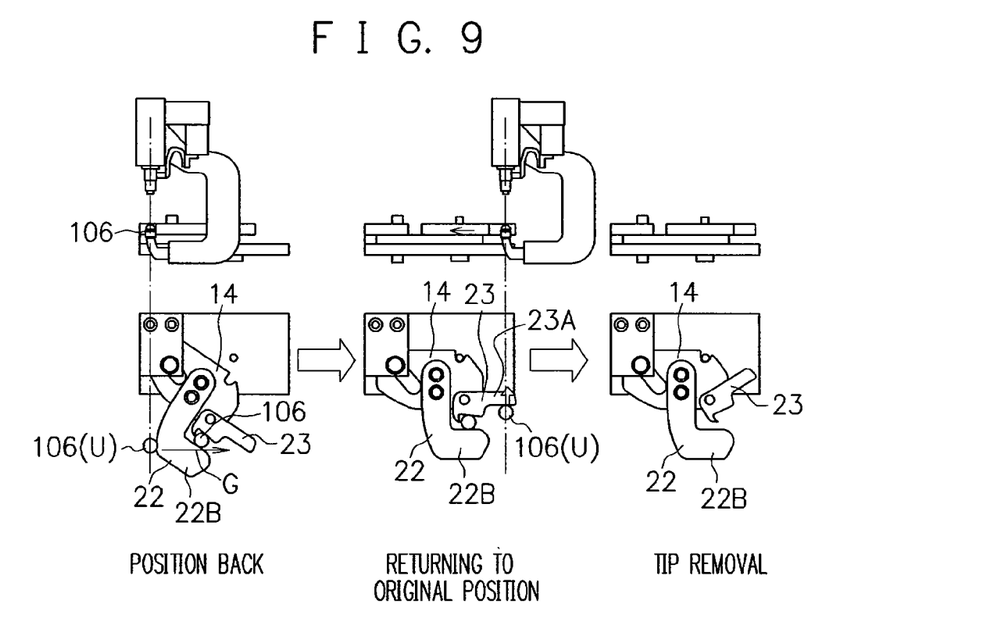
FIG. 9 is a view for explaining an operation after the tip is detached by the spot welding tip detaching apparatus according to the embodiment of the present invention.
Figure 10:
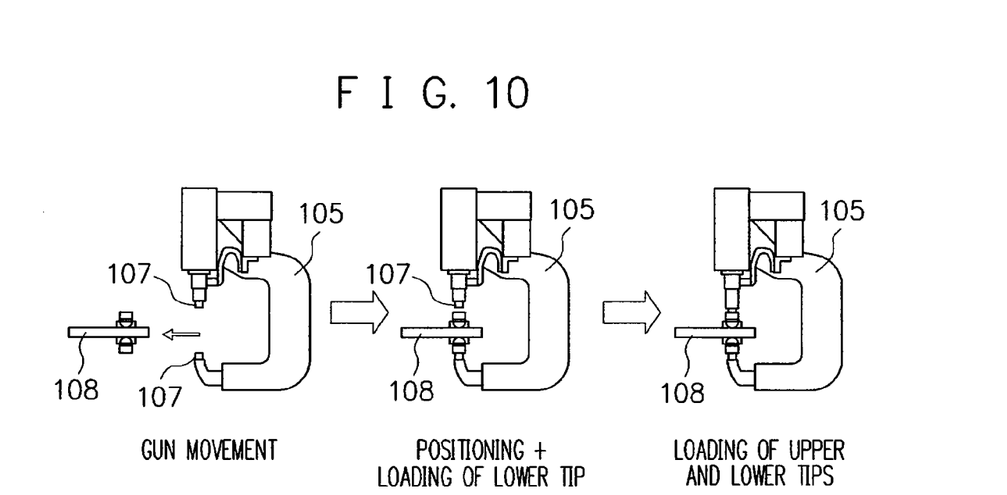
FIG. 10 is a view for explaining an operation after the tip is detached by the spot welding tip detaching apparatus according to the embodiment of the present invention.

Hereinafter, the tip detaching operation by the tip detaching apparatus 1 will be described. FIG. 5A to FIG. 5E are views for explaining the tip detaching operation in order of events and are views illustrating side surfaces and plane surfaces of the tip detaching apparatus 1 and the spot welding gun 105. Further, FIG. 6 and FIG. 7 are views for explaining a detailed operation of the holder part 21 of the tip detaching apparatus 1 during the tip detaching operation. Further, FIG. 8 is a view schematically illustrating how the tip is detached by the tip detaching apparatus 1. Further, FIG. 9 and FIG. 10 are views for explaining an operation after the tip is detached by the tip detaching apparatus 1. Hereinafter, the tip detaching procedure according to this embodiment will be described by using FIG. 5A to FIG. 10.

(Step 1)

Figure 5A:
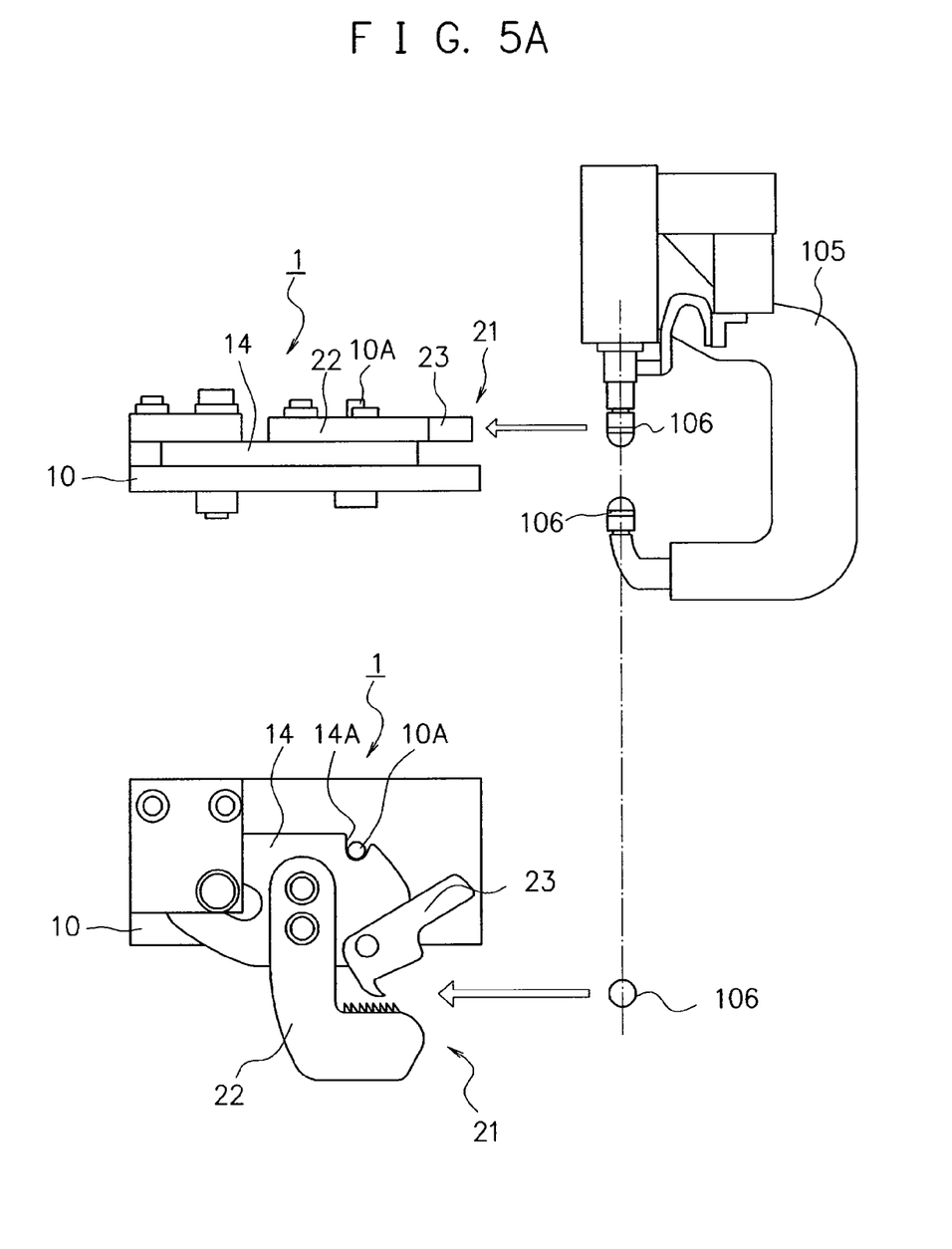
FIG. 5A is a view for explaining a tip detaching operation by the spot welding tip detaching apparatus according to the embodiment of the present invention in order of events, and is a view illustrating side surfaces and plane surfaces of the tip detaching apparatus and the spot welding gun.

First, the articulated robot 100 is controlled to move the upper tip 106 to a position where the upper tip 106 faces the holder part 21 as illustrated in FIG. 5A. In more detail, the tip 106 is moved so as to face the space between the meshing piece 22 and the clamping piece 23 of the holder part 21.

(Step 2)

Figure 5B:
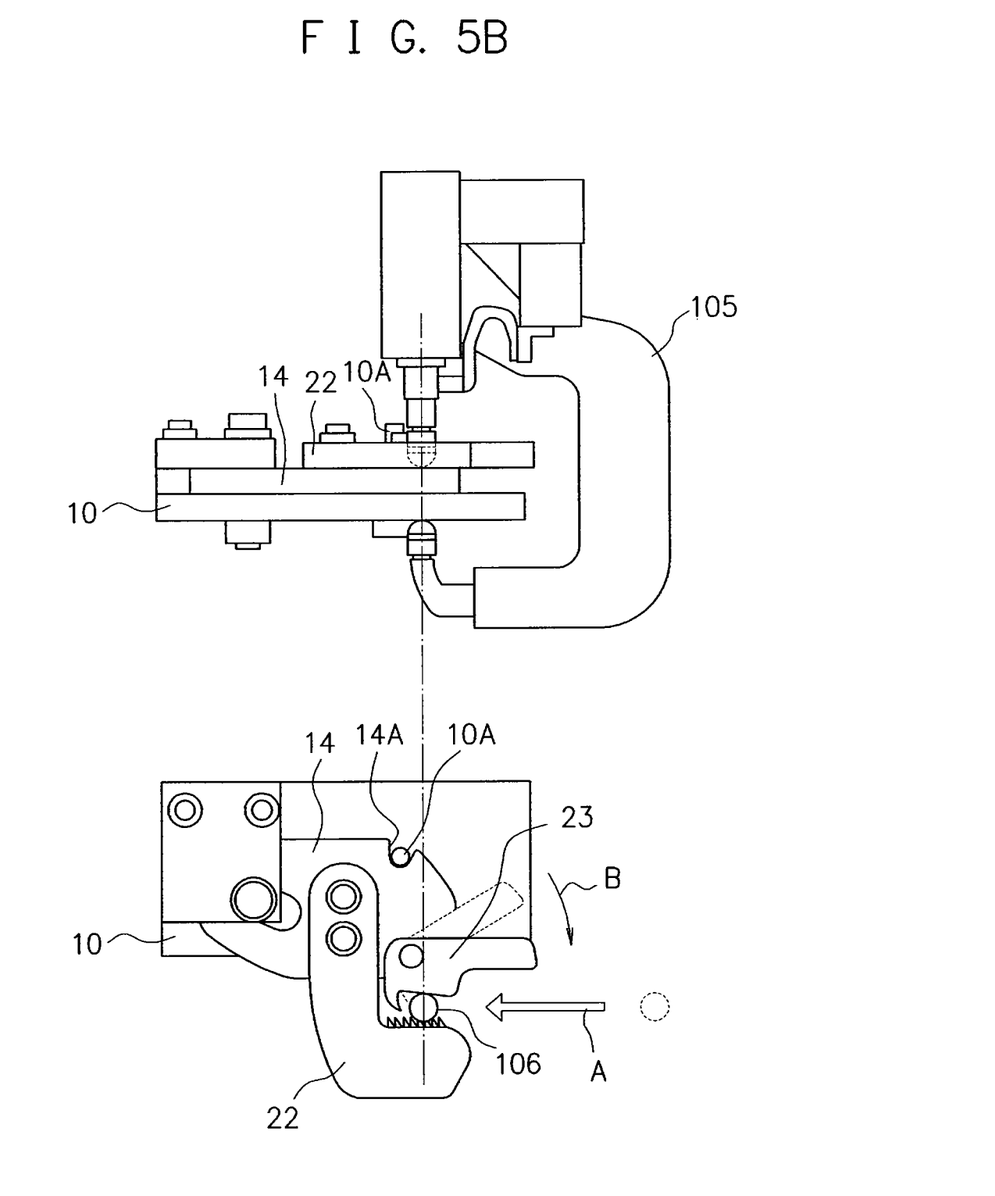
FIG. 5B is a view for explaining the tip detaching operation by the spot welding tip detaching apparatus according to the embodiment of the present invention in order of events, and is a view illustrating the side surfaces and the plane surfaces of the tip detaching apparatus and the spot welding gun.

Next, the articulated robot 100 is controlled to linearly move the tip 106 (first linear movement) as illustrated in FIG. 5B (FIG. 5B, arrow A direction), thereby making the tip 106 enter the space between the meshing piece 22 and the clamping piece 23 of the holder part 21. At this time, the tip 106 is received in the space between the meshing piece 22 and the clamping piece 23 and the clamping piece 23 rotates as illustrated in FIG. 6. More specifically, here, the tip 106 abuts on and presses the front surface-side abutting portion 23C in the short side portion 23B of the clamping piece 23, so that the clamping piece 23 rotates (FIG. 5B or FIG. 6, arrow B). Then, the clamping piece 23 presses the tip 106 against the teeth portion 22C of the meshing piece 22 from the lateral direction by the lateral-side abutting portion 23D on the inner side of the long side portion 23A (FIG. 6, arrow C). Here, since the movement of the movable plate 14 in the longitudinal direction of the base plate 10 is restricted by the bolt stopper 10A and the ball plunger 19, the tip 106 is pressed against the meshing piece 22 by the lateral-side abutting portion 23D owing to the force accompanying the linear movement of the tip 106 itself, so that the tip 106 is engaged with the meshing piece 22 and the clamping piece 23.

(Step 3)

Figure 5C:
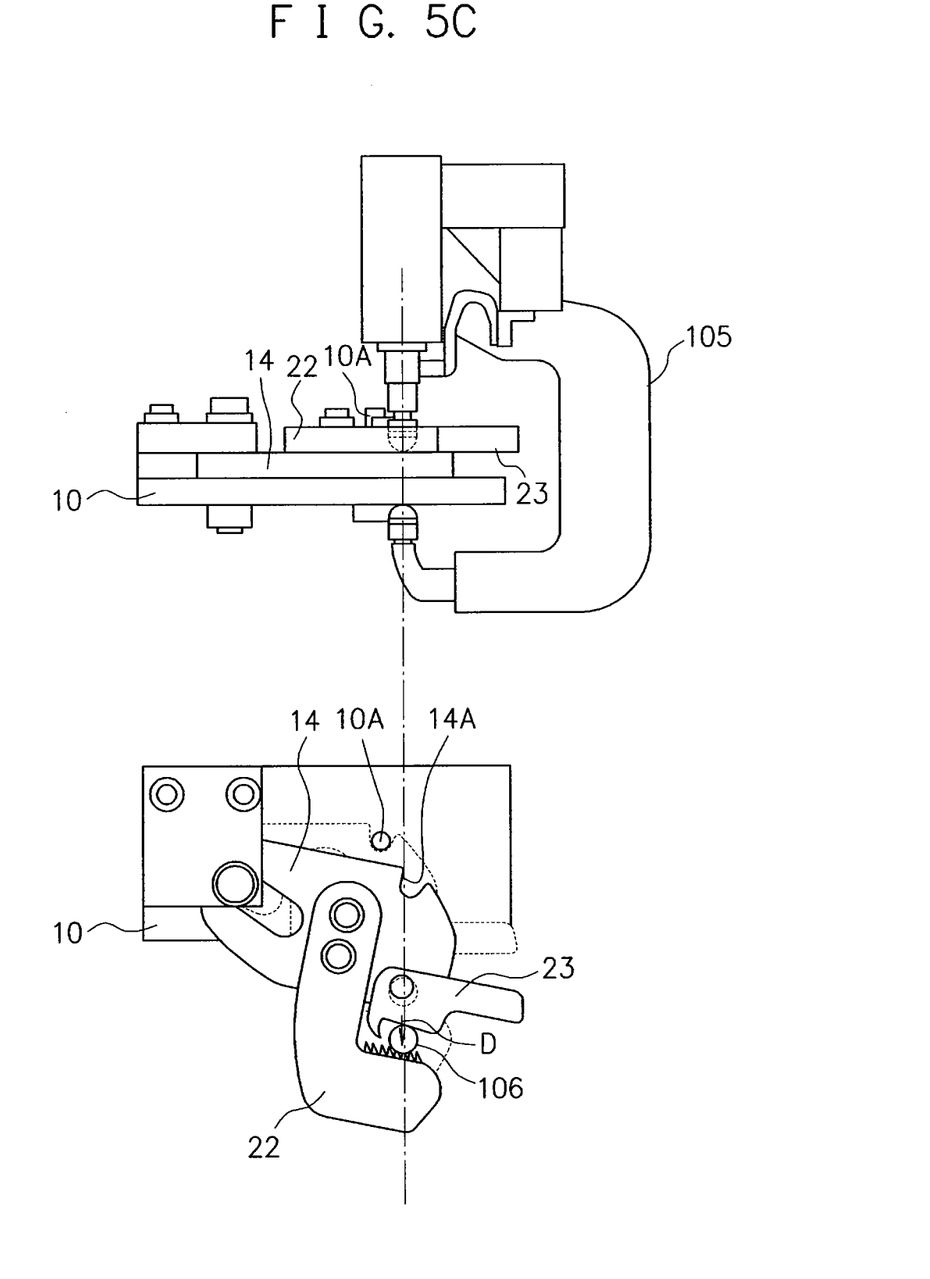
FIG. 5C is a view for explaining the tip detaching operation by the spot welding tip detaching apparatus according to the embodiment of the present invention in order of events, and is a view illustrating the side surfaces and the plane surfaces of the tip detaching apparatus and the spot welding gun.

Next, as illustrated in FIG. 5C, the articulated robot 100 is controlled to linearly move the tip 106 in the lateral direction (FIG. 5C, arrow D) (second linear movement) on a horizontal plane from the current position of the tip 106. That is, the tip 106 is linearly moved in the direction that is the direction perpendicular to the direction in which the tip 106 enters the space between the meshing piece 22 and the clamping piece 23 and that is the direction in which the tip 106 separates from the base plate 10 (first linear movement). In this embodiment, this operation first releases the engagement state by the ball plunger 19, thereby allowing the rotation and the translational movement of the movable plate 14. Then, as a result of this operation, the tip 106 is sandwiched by the meshing piece 22 and the clamping piece 23.

FIG. 7 is an enlarged view of the holder part 21 during the operation of Step 3. Specifically, when the sandwiched tip 106 is linearly moved in the direction in which the tip 106 separates from the base plate 10, the tip 106 is pressed against the teeth portion 22C. At this time, since the peaks of the cutting tooth-shaped portions of the teeth portion 22C are formed to be inclined toward the root-side side portion 22A, the tip 106 is pushed in a deep direction (FIG. 7, arrow E direction) of the space between the meshing piece 22 and the clamping piece 23. Consequently, the tip 106 is sandwiched (engagingly held) by the meshing piece 22 and the clamping piece 23.

(Step 4)

Figure 5D:
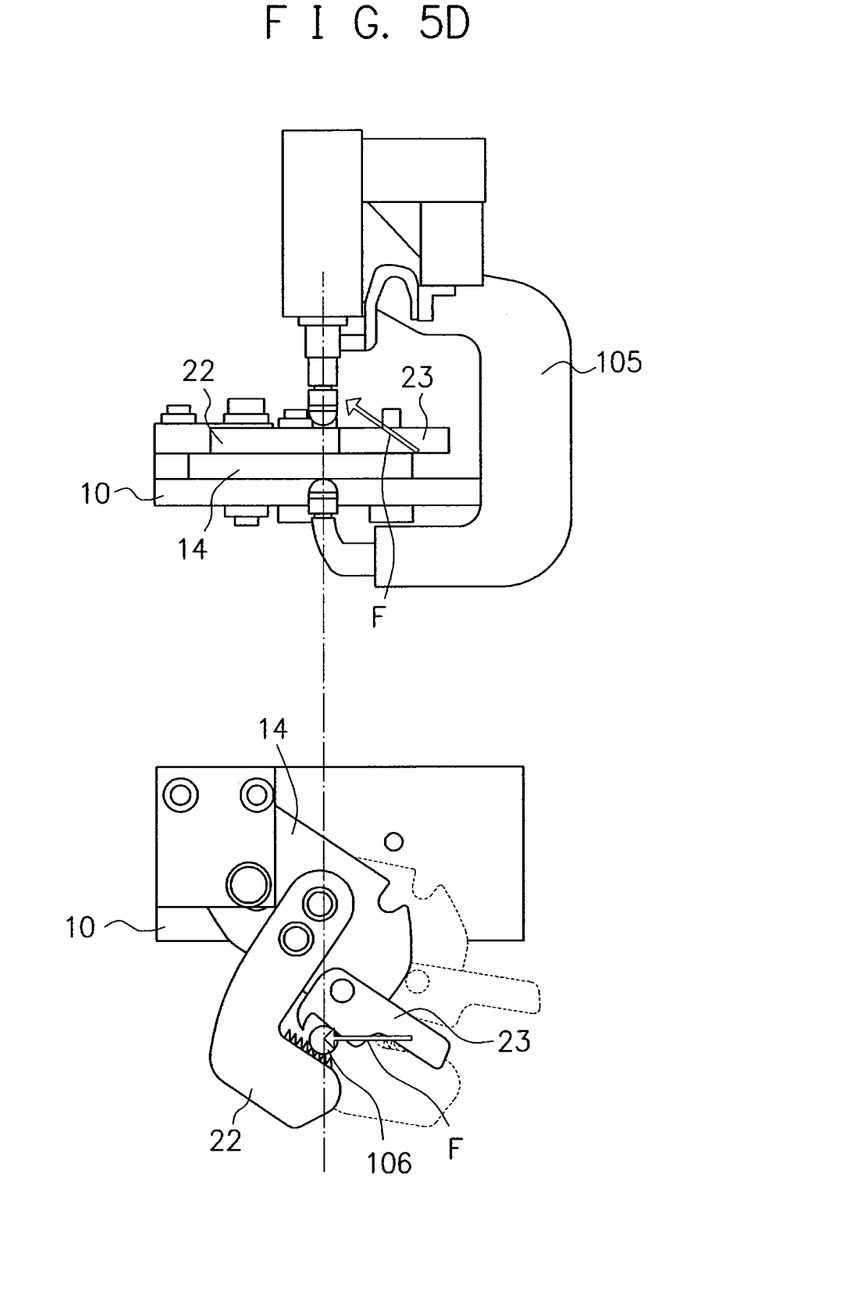
FIG. 5D is a view for explaining the tip detaching operation by the spot welding tip detaching apparatus according to the embodiment of the present invention in order of events, and is a view illustrating the side surfaces and the plane surfaces of the tip detaching apparatus and the spot welding gun.

Next, as illustrated in FIG. 5D, the articulated robot 100 is controlled to linearly move the tip 106 from the current position, accompanied by the movement in the up direction (third linear movement) (FIG. 5D, arrow F). Here, as a result of the movement of the tip 106, the movable plate 14 and the holder part 21 integrally provided on the movable plate 14 rotate and move while holding the tip 106. That is, though the positions of the movable plate 14 and the holder part 21 relative to the tip 106 are not changed, the movable plate 14 and the holder part 21 as a whole move, accompanied by the rotation. Consequently, the tip 106 makes the linear movement accompanied by the movement in the up direction while being rotated by the movable plate 14 and the holder part 21.

Figure 5E:
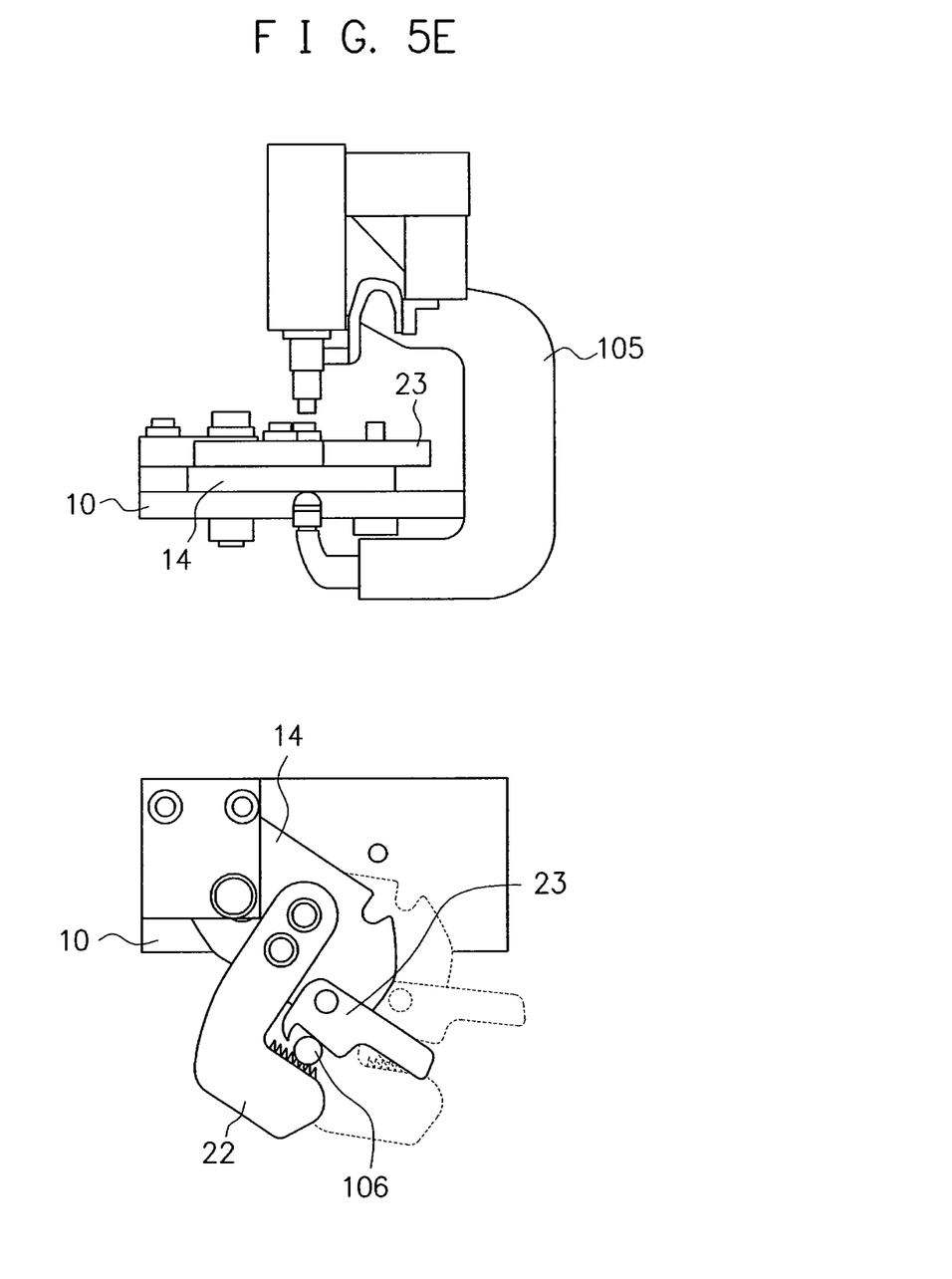
FIG. 5E is a view for explaining the tip detaching operation by the spot welding tip detaching apparatus according to the embodiment of the present invention in order of events, and is a view illustrating the side surfaces and the plane surfaces of the tip detaching apparatus and the spot welding gun.

FIG. 5E illustrates a state after the tip 106 makes the linear movement accompanied by the movement in the up direction while being rotated by the movable plate 14 and the holder part 21. Though fitted in the shank 107, the tip 106 is moved in the detachment direction (up direction) while being rotated, so that the tip 106 is detached without any need for a strong force. FIG. 8 is a view schematically illustrating how the tip 106 is detached. As illustrated in FIG. 8, since the tip 106 is held by the holder part 21, there is no change in its position in terms of the up and down direction, but the shank 107 separates in the up direction while the tip 106 is rotated, so that the tip 106 is detached by the holder part 21.

In this manner, the tip detaching apparatus 1 according to this embodiment detaches the tip 106 by using the linear movement operation of the tip 106 caused by the articulated robot 100. That is, it is possible to detach the tip 106 without any need for a motive power of the tip detaching apparatus 1 itself.

After the tip 106 is thus detached, the detached tip 106 needs to be detached from the holder part 21 and a new tip needs to be attached. Hereinafter, this operation will be described.

(Step 5)

FIG. 9 is a view for explaining the operation of detaching the tip 106 from the holder part 21 and returning the holder part 21 to an original position, that is, returning the ball plunger 19 to the engaged state.

First, the articulated robot 100 is controlled to make the lower tip 106 (U) which has not been detached abut on a rear side of the meshing piece 22 of the holder part 21 and linearly move the lower tip 106 (U) (arrow G, position back). Consequently, the movable plate 14 gradually approaches the base plate 10 side while rotating. Then, after getting out of the abutting state on the rear side of the meshing piece 22, the tip 106 (U) is turned at a right angle from the current linear movement state and is linearly moved toward the base plate 10 to abut on the long side portion 23A of the clamping piece 23 (returning to the original position). Consequently, the head portion of the plunger 19 on the rear surface of the movable plate 14 climbs up to the upper surface of the base plate 10, so that the head portion is engaged with the fitting hole 20 and the bolt stopper 10A is engaged with the cutout 14A. Further, thereafter, the long side portion 23A of the clamping piece 23 is pressed by the tip 106, whereby the tip 106 currently detached, that is, the tip 106 held by the holder part 21 is dropped to be detached (tip detachment).

In the operation here, the tip 106 currently held by the holder part 21 is finally dropped by the tip 106 pressing the long side portion 23A of the clamping piece 23. In this case, the long side portion 23A of the clamping piece 23 needs to be set longer than the tip-side side portion 22B of the meshing piece 22 in terms of the extending direction of the tip-side side portion 22B, in the state where the tip 106 is held by the holder part 21. This is because without any space in which the tip 106 can abut on the clamping piece 23 to cause the rotation, it is not possible to detach the tip 106 from the holder part 21 by the control of the articulated robot 100.

Further, after the tip 106 is detached from the holder part 21, it is necessary to detach the lower tip 106 of the spot welding gun 105. The operation for detaching the lower tip 106 is the same as the operation described with reference to FIG. 5A to FIG. 5E, and therefore detailed description thereof will be omitted. What is different is that the articulated robot 100 is controlled so that the linear movement accompanied by the movement in the up direction when the upper tip 106 is detached is replaced by the linear movement accompanied by the movement in the down direction. Further, the operation of detaching the tip 106 from the holder part 21 is also the same as the above-described operation.

(Step 6)

Next, after the upper and lower tips 106 in the spot welding gun 105 are detached, new tips are attached. FIG. 10 is a view for explaining the operation when the new tips are attached.

First, the articulated robot 100 is controlled to move to the vicinity of the tip holder 108 (movement of the gun). Next, by the positioning, the shanks 107 is made to face the tips held by the tip holder 108 (positioning). Then, the articulated robot 100 is moved so that the lower shank 107 is fitted in the tip held on the lower side of the tip holder 108 (loading of the lower tip). Subsequently, the upper shank 107 is driven downward so that the upper shank 107 is fitted in the tip held on the upper side of the tip holder 108 (loading of the upper tip).

In the foregoing, the spot welding tip detaching apparatus 1 according to the embodiment of the present invention is described. As described above, the spot welding tip detaching apparatus 1 according to this embodiment can detach the tips 106 by using the linear movement operation of the tips 106 along a predetermined route caused by the articulated robot 100. That is, in the operation of detaching the tips 106, the motive power of the tip detaching apparatus 1 itself is not necessary at all, which makes it possible to detach the tips 106 without any need to configure a power source such as a motor and a control system and with an extremely simple structure. This can provide a cost reduction effect and can also provide an energy saving effect. Further, owing to the extremely simple structure, an apparatus compatible with the size of the tips 106 can be easily manufactured, and flexible compatibility is obtained irrespective of the shape and so on of the spot welding gun. Further, in the tip detaching operation, since the tips 106 are detached while they are held and rotated, gaps between the tips 106 and the shanks 107 are not used and no load is given to the shanks 107 and so on.

Further, since the operation of the articulated robot 100 at the time of detaching the tips 106 is only the linear motion, the operation, programming, and the like for controlling the articulated robot 100 are also simple, which can greatly facilitate the detachment of the tips 106 by the spot welding tip detaching apparatus 1. Further, the spot welding tip detaching apparatus 1 can be manufactured at extremely low cost since it is mainly made of a plate material, and has no restriction in its installation space since it is compact.

Further, the holder part 21 holding the tip is composed of the meshing piece 22 and the clamping piece 23 and are designed to have specific shapes, and thus various measures are taken. For example, a measure for firmly hold the tip 106 is that the teeth portion 22C is formed in the meshing piece 22 and the clamping piece 23 is made rotatable to press the tip 106. Further, a measure for facilitating the detachment and for enabling the automatic detaching of the held tip is that the long side portion 23A of the clamping piece 23 has a shape longer than the tip-side side portion 22B of the meshing piece 22 in terms of the extending direction of the tip-side side portion 22B, in the state where the tip is sandwiched therebetween. This structure also improves usability.

In the spot welding tip detaching apparatus 1 according to this embodiment, the holder part 21 is composed of the meshing piece 22 and the clamping piece 23, but they may be integrated. For example, a pair of holder pieces are set parallel to form space therebetween, and the space is made to get gradually narrower. This makes it possible to sandwich the entering tip in a fitted state.

Further, in this embodiment, for firm engagement of the tip 106, after the tip 106 enters the space between the meshing piece 22 and the clamping piece 23, the tip is linearly moved in the direction that is the direction perpendicular to the entering direction and is the direction in which the tip separates from the base plate 10, that is, the tip 106 is caused to make the aforesaid second linear movement (FIG. 5C), but this operation is not always necessary if the tip 106 is firmly held in the first entering operation. That is, the tip can be detached only by three kinds of linear movements, that is, the aforesaid first linear movement, the linear movement in the same direction as that of the first linear movement for releasing the engagement of the ball plunger 19, and the aforesaid third linear movement.

Further, in this embodiment, the long hole 15 is formed, but this is not restrictive and any hole having a larger sectional area than the shaft 16 and allowing the sufficient movement of the movable plate 14 relative to the base plate 10 may be adopted, and the long hole 15 may be formed as a circular guide hole. As for details of these parts, constituent members may be designed so that predetermined operations are performed in accordance with the operation of the articulated robot 100.

Further, in this embodiment, the operation of the articulated robot 100 is used for detaching the tip 106, but the apparatus is not limited to that used with the articulated robot 100 and may be other apparatuses. When a movable range of an apparatus loaded with the spot welding gun 105 is limited, changing an installation place or an installation direction of the spot welding tip detaching apparatus 1 enables suitable use.

According to the present invention, it is possible to easily detach a tip fitted in a spot welding gun without requiring a motive power and with an extremely simple structure. Further, it is possible to easily detach the tip irrespective of the sizes and shapes of a gap between the tip and a shank and of the spot welding gun. Further, it is possible to detach the tip without giving any load to a spot welding gun side.

The present embodiments are to be considered in all respects as illustrative and no restrictive, and all changes which come within the meaning and range of equivalency of the claims are therefore intended to be embraced therein. The invention may be embodied in other specific forms without departing from the spirit or essential characteristics thereof.

What is claimed is:

1. A spot welding tip detaching apparatus which detaches a tip fitted in a spot welding gun, the apparatus comprising:
    a movable plate having a guide hole through which a shaft set upright in a base plate is inserted with a gap being left between the guide hole and the shaft, rotatable relative to the base plate, and movable along the base plate within a range of the guide hole;
    an engaging/stopping part that stops said movable plate at a predetermined position of the base plate by engagement in an engageable/disengageable manner; and
    a holder part provided integrally on said movable plate to hold the tip fitted in the spot welding gun, the holder part sandwiching the tip between two members of the holder part, wherein
    according to movement of the tip fitted in the spot welding gun along a predetermined route, said holder part rotates the tip, while holding the tip, to detach the tip from the spot welding gun.

2. The spot welding tip detaching apparatus according to claim 1, wherein
    said holder part comprises:
        a meshing piece fixedly supported by said movable plate; and
        a clamping piece rotatably supported by said movable plate, with a space being formed between the meshing piece and the clamping piece, and
    said holder part engagingly holds the tip in the space by making the meshing piece and the clamping piece work together.

3. The spot welding tip detaching apparatus according to claim 2, wherein:
    the clamping piece has a substantially L shape, and when a short side portion of the substantially L shape abuts on the tip which is linearly moved with the spot welding gun to enter the space between the meshing piece and the clamping piece, the clamping piece rotates and a long side portion of the substantially L shape presses the tip against the meshing piece; and
    the meshing piece has a cutting tooth-shaped portion at a portion abutting on the tip, and the cutting tooth-shaped portion is formed to be inclined in a direction in which the tip enters the space between the meshing piece and the clamping piece.

4. The spot welding tip detaching apparatus according to claim 3, wherein:
    in the spot welding tip detaching apparatus,
    said holder part is capable of being engaged with the tip when the tip is caused to make a first linear movement with the spot welding gun to enter the space between the meshing piece and the clamping piece,
    a second linear movement of the tip in a direction which, in a horizontal plane, is perpendicular to the direction of the first linear movement releases the engagement of said engaging/stopping part and causes the tip to be held by said holder part in the sandwiched manner, and
    a third linear movement of the tip in a direction which, in the horizontal plane, is perpendicular to the direction of the second linear movement, accompanied by movement in an up direction or a down direction causes said holder part to rotate the tip while holding the tip and to detach the tip from the spot welding gun.

5. The spot welding tip detaching apparatus according to claim 4, wherein said engaging/stopping part is composed of: a stopper restricting the movement of said movable plate from the predetermined position in the direction of the first linear movement; and a maintaining part maintaining a state where the movement of said movable plate is restricted by said engaging/stopping part.

6. The spot welding tip detaching apparatus according to claim 5, wherein the maintaining part comprises a ball plunger provided between the base plate and said movable plate and a concave portion in which a ball portion of the ball plunger is fitted.

7. The spot welding tip detaching apparatus according to claim 6, wherein:
    the meshing piece has a substantially hook shape, has a root side of the substantially hook shape fixedly supported by said movable plate, and abuts on the tip at a tip-side side portion of the substantially hook shape; and
    at least when the tip is held, the long side portion of the substantially L shape of the clamping piece is longer than the tip-side side portion of the meshing piece in terms of an extending direction of the tip-side side portion.

8. The spot welding tip detaching apparatus according to claim 6, further comprising
    a restricting part restricting movement of said movable plate in an axial direction of the shaft.

9. The spot welding tip detaching apparatus according to claim 5, wherein:
    the meshing piece has a substantially hook shape, has a root side of the substantially hook shape fixedly supported by said movable plate, and abuts on the tip at a tip-side side portion of the substantially hook shape; and
    at least when the tip is held, the long side portion of the substantially L shape of the clamping piece is longer than the tip-side side portion of the meshing piece in terms of an extending direction of the tip-side side portion.

10. The spot welding tip detaching apparatus according to claim 5, further comprising
    a restricting part restricting movement of said movable plate in an axial direction of the shaft.

11. The spot welding tip detaching apparatus according to claim 4, wherein:
    the meshing piece has a substantially hook shape, has a root side of the substantially hook shape fixedly supported by said movable plate, and abuts on the tip at a tip-side side portion of the substantially hook shape; and at least when the tip is held, the long side portion of the substantially L shape of the clamping piece is longer than the tip-side side portion of the meshing piece in terms of an extending direction of the tip-side side portion.

12. The spot welding tip detaching apparatus according to claim 4, further comprising
a restricting part restricting movement of said movable plate in an axial direction of the shaft.

13. The spot welding tip detaching apparatus according to claim 3, wherein:
the meshing piece has a substantially hook shape, has a root side of the substantially hook shape fixedly supported by said movable plate, and abuts on the tip at a tip-side side portion of the substantially hook shape; and at least when the tip is held, the long side portion of the substantially L shape of the clamping piece is longer than the tip-side side portion of the meshing piece in terms of an extending direction of the tip-side side portion.

14. The spot welding tip detaching apparatus according to claim 3, further comprising
a restricting part restricting movement of said movable plate in an axial direction of the shaft.

15. The spot welding tip detaching apparatus according to claim 2, further comprising
a restricting part restricting movement of said movable plate in an axial direction of the shaft.

16. The spot welding tip detaching apparatus according to claim 1, further comprising
a restricting part restricting movement of said movable plate in an axial direction of the shaft.

* * * * *